United States Patent
Sattler et al.

(10) Patent No.: US 8,304,960 B2
(45) Date of Patent: Nov. 6, 2012

(54) METHODS FOR REDUCING POWER CONSUMPTION OF AT LEAST PARTIALLY RESONANT ACTUATOR SYSTEMS AND SYSTEMS THEREOF

(75) Inventors: Stefan Sattler, Gleisdorf (AT); Thomas Guidarelli, Farmington, NY (US)

(73) Assignees: New Scale Technologies, Victor, NY (US); Austriamicrosystems AG, Interpremstaetten (AT)

( * ) Notice: Subject to any disclaimer, the term of this patent is extended or adjusted under 35 U.S.C. 154(b) by 411 days.

(21) Appl. No.: 12/589,934

(22) Filed: Oct. 29, 2009

(65) Prior Publication Data
US 2011/0101894 A1    May 5, 2011

(51) Int. Cl.
*H01L 41/09* (2006.01)
(52) U.S. Cl. ...................................................... 310/317
(58) Field of Classification Search .................. 310/314, 310/316.01–316.03, 317–319
See application file for complete search history.

(56) References Cited

U.S. PATENT DOCUMENTS

| | | | |
|---|---|---|---|
| 6,940,209 B2 | 9/2005 | Henderson | |
| 7,170,214 B2 | 1/2007 | Henderson | |
| 7,309,943 B2 | 12/2007 | Henderson et al. | |
| 7,339,306 B2 | 3/2008 | Henderson | |
| 7,626,315 B2 * | 12/2009 | Nagase | 310/316.03 |
| 7,667,372 B2 * | 2/2010 | Ollila | 310/319 |
| 2002/0008440 A1 * | 1/2002 | Hedenetz et al. | 310/316.03 |
| 2002/0011762 A1 * | 1/2002 | Klenk et al. | 310/316.03 |
| 2002/0023622 A1 * | 2/2002 | Rueger et al. | 123/490 |
| 2003/0150429 A1 * | 8/2003 | Rueger | 123/490 |
| 2004/0036382 A1 * | 2/2004 | Yuasa et al. | 310/317 |
| 2005/0285477 A1 * | 12/2005 | Ollila | 310/317 |
| 2006/0049716 A1 * | 3/2006 | Yuasa | 310/317 |
| 2006/0113865 A1 * | 6/2006 | Yoshida | 310/317 |
| 2007/0040475 A1 * | 2/2007 | Namikawa | 310/323.17 |

* cited by examiner

*Primary Examiner* — Thomas Dougherty
(74) *Attorney, Agent, or Firm* — LeClairRyan, a Professional Corporation

(57) ABSTRACT

A method, computer readable medium, and a system for reducing power consumption of an at least partially resonant actuator system includes adjusting a driving system with an actuator controller computing device configured to provide a driving signal including a delay interval during a transition in the driving signal. The driving system provides the driving signal with the delay interval to an at least one partially resonant actuator device.

22 Claims, 8 Drawing Sheets

METHODS FOR REDUCING POWER CONSUMPTION OF AT LEAST PARTIALLY RESONANT ACTUATOR SYSTEMS AND SYSTEMS THEREOF

FIELD OF THE INVENTION

This invention relates to methods and systems for improving performance of at least partially resonant actuator systems and, more particularly, methods for reducing power consumption of at least partially resonant actuator systems and systems thereof.

BACKGROUND

Resonant actuator systems are used in a variety of different applications, such as to move optics within cameras by way of example only. Examples of resonant actuator systems may be found in U.S. Pat. No. 6,940,209, titled, "Ultrasonic Lead Screw Motor"; U.S. Pat. No. 7,339,306, titled, "Mechanism Comprised of Ultrasonic Lead Screw Motor"; U.S. Pat. No. 7,170,214, titled, "Mechanism Comprised of Ultrasonic Lead Screw Motor"; and U.S. Pat. No. 7,309,943, titled, "Mechanism Comprised of Ultrasonic Lead Screw Motor," which are hereby incorporated herein by reference in their entireties. In these different applications, control over the velocity of operation while at the same time reducing power consumed for extended battery life and component life of the resonant actuator systems often is required.

To maximize the performance of a reduced voltage, resonant actuator, prior systems often have used a full bridge driver to double the available supply voltage applied to the resonant actuator. However, the use of a full bridge driver can make speed regulation as well as management of power consumption more difficult.

More specifically, when switching capacitive loads with a full bridge driver switching sequence, the power dissipation in the switches is provided by equation (1):

$$P = 2 \cdot \frac{C \cdot (2 \cdot V_{DD})^2}{2} \cdot f = 4 \cdot C \cdot V_{DD}^2 \cdot f \quad (1)$$

since the voltage across the switches is twice the supply voltage $V_{DD}$. The transitions for this switching sequence are monotonic and continuous back and forth between the positive and negative limits of the available supply voltage.

As discussed earlier, the use of such a continuous full bridge driver sequence using a full bridge driver circuitry can make speed regulation as well as management of power consumption more difficult. Modulation of pulse width has been used to provide effective regulation of output speed, but unfortunately saves little in power consumption because the switching frequency of the full bridge sequence does not change.

SUMMARY

A method for reducing power consumption of an at least partially resonant actuator system in accordance with embodiments of the present invention includes adjusting a driving system with an actuator controller computing device configured to provide a driving signal including a delay interval during a transition in the driving signal. The method includes providing with the driving system the driving signal with the delay interval to at least one partially resonant actuator device.

A computer readable medium in accordance with other embodiments of the present invention includes instructions stored on the medium for reducing power consumption of an at least partially resonant actuator system comprising machine executable code which when executed by at least one processor, causes the processor to perform steps including adjusting a driving system with an actuator controller computing device configured to provide a driving signal including a delay interval during a transition in the driving signal. The driving signal is provided with the delay to an at least one partially resonant actuator device.

An at least partially resonant actuator system includes an actuator controller computing device that adjusts a driving system based upon a driving signal including a delay interval during a transition in the driving signal. An at least one partially resonant actuator device receives the driving signal with the delay interval from the adjusted driving system.

The present invention provides a number of advantages including reducing power consumption in at least partially resonant actuator systems. With the present invention, power consumption savings can exceed over 35% while maintaining steady motor forward and reverse speeds and without any substantial reduction in the speed of operation of the actuator system. Additionally, the present invention is quiet and does not add undesirable audio noise to the output of the actuator system.

DETAILED DESCRIPTION

A resonant actuator system 100(1) in accordance with embodiments of the present invention is illustrated in FIGS.

1A and 1B. The resonant actuator system 100(1) includes an actuator device 102(1) and a driving system 104 comprising an actuator controller system 106 and a driver assembly 108 and, although the system can comprise other numbers and types of systems, devices, and components which are connected in other manners. The present invention provides a number of advantages including providing more effective and efficient power consumption of at least partially resonant actuator devices.

Figure 1A:
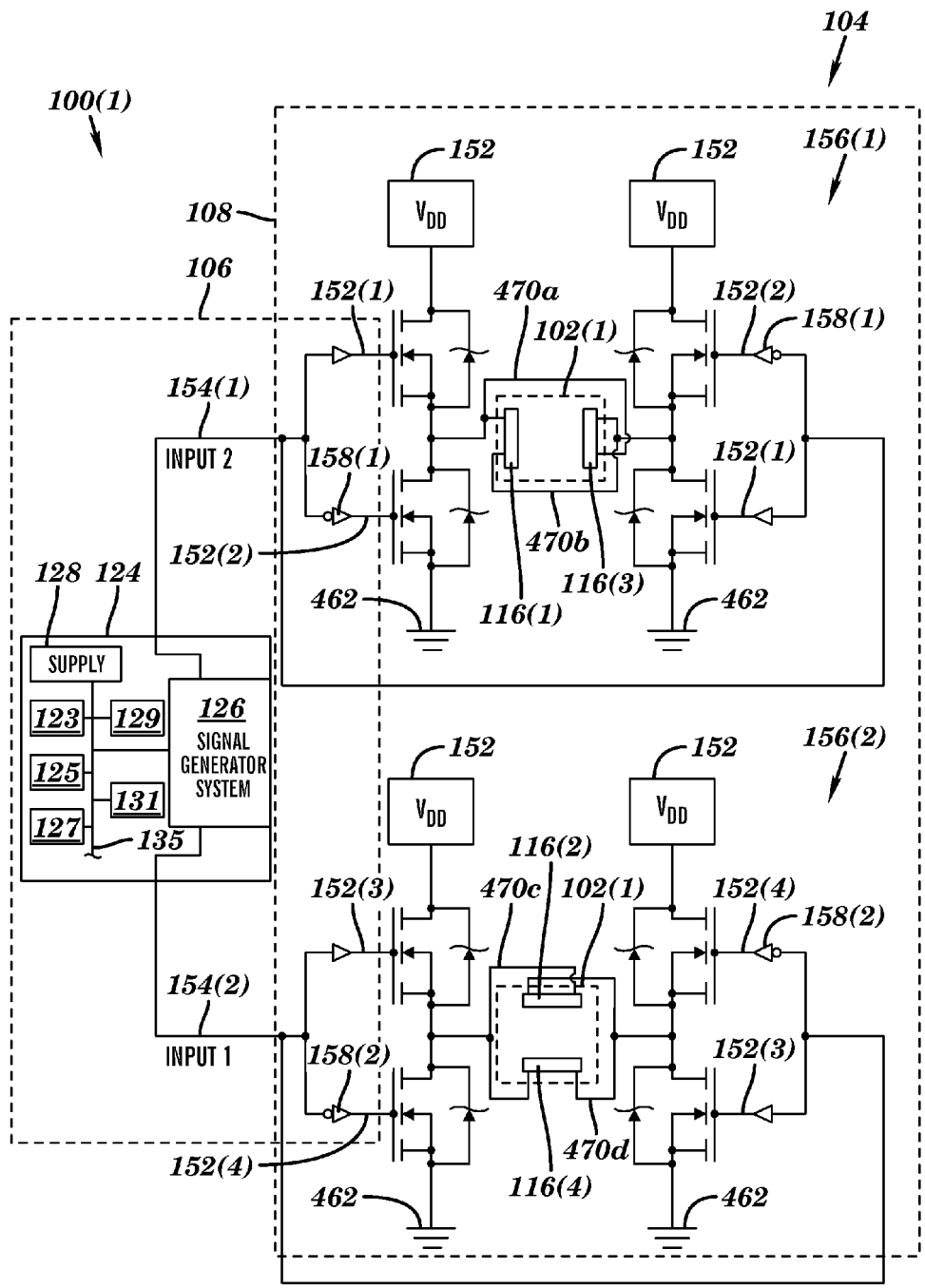
FIG. 1A is a partial block diagram, partial circuit diagram, and a partial end view of a resonant actuator system including a full bridge driving system in accordance with embodiments of the present invention.
Figure 1B:
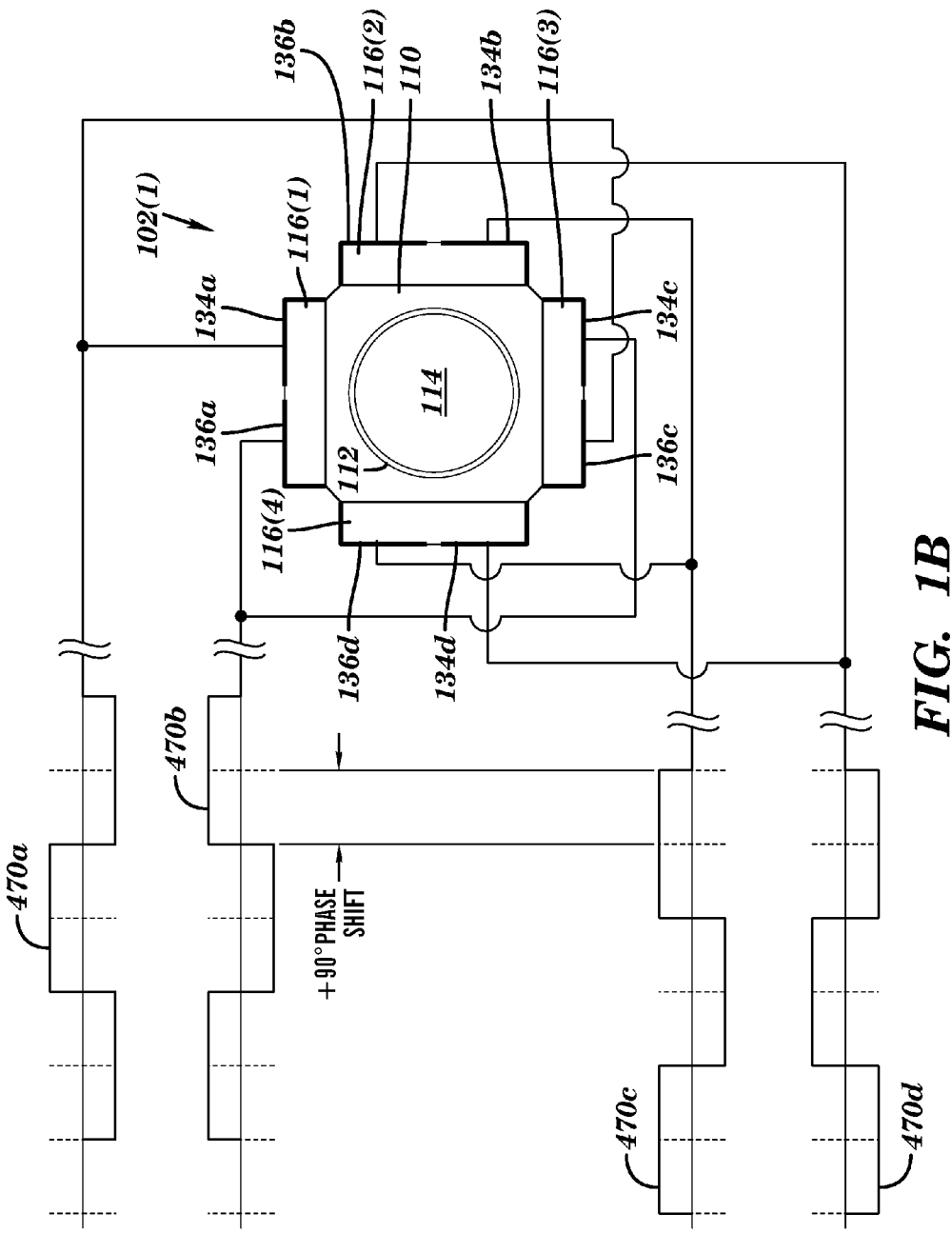
FIG. 1B is a partial circuit diagram, and a partial end view of a resonant actuator system with a linear actuator device driven by signals from the full bridge driving system of FIG. 1A in accordance with embodiments of the present invention.

Referring more specifically to FIG. 1B, the actuator device 102(1) generates a force to move a load, such as an optical lens by way of example, in a linear direction at a controlled velocity, although the actuator device 102(1) can move other types of loads in other directions. The actuator device 102(1) in this embodiment is the same in structure and operation as the linear actuator device illustrated and disclosed in U.S. patent application Ser. No. 12/228,923, filed Aug. 18, 2008 for, "Reduced-Voltage, Linear Motor Systems and Methods Thereof" which is herein incorporated by reference, although other types of actuator devices can be used.

The actuator device 102(1) includes an element 110 with a threaded passage 112, a threaded shaft 114, piezoelectric members 116(1)-116(4) further including "L" shaped electrodes 134a-d and 136a-d, respectively, as described in more detail below with respect to FIG. 1B, although the actuator device 102(1) can include other types and numbers of systems, devices, and components which are connected in other manners. The inner passage of the element 110 is threaded throughout its length, although the passage could have other configurations, such as being partially threaded. The threaded shaft 114 is screwed into the threaded passage 112 of the element 110 for rotation about and linear movement along the passage at a controlled velocity.

Each of the piezoelectric members 116(1)-116(4) comprises multiple layers of piezoelectric material, although other numbers and types of vibratory elements could be used. Each of the piezoelectric members 116(1)-116(4) changes length when subjected to a voltage differential. The piezoelectric members 116(1) and 116(3) are connected to substantially opposing sides of element 110 about threaded passage 112 and the piezoelectric members 116(2) and 116(4) also connected to substantially opposing sides of element 110 about threaded passage 112, although other numbers of vibratory members connected in other configurations could be used. The electrodes 134a-d and 136a-d are each coupled to one of the piezoelectric members 116(1)-116(4), as described below with reference to FIG. 1B, to apply the voltage differential across the piezoelectric members 116(1)-116(4) based on applied drive signals 470a-470d generated from input drive signals 152(1)-152(4) (also referred to herein as input driving signals 152(1)-152(4)), although other manners of coupling other types and numbers of drive signals to the vibratory members can be used.

Referring to FIG. 1B, the applied drive signals 470a-d are illustrated and shown being transmitted to respective piezoelectric members 116(1)-116(4) that bend the element 110 back and forth along a first plane in response to the applied drive signals 470a-d. The first applied drive signal 470a is an approximately square-wave voltage signal that is about 180 degrees out of phase from the second applied drive signal 470b, which is also an approximately square-wave voltage signal. Similarly, the third applied drive signal 470c is an approximately square-wave voltage signal that is about 180 degrees out of phase from the fourth applied drive signal 470d, which is also an approximately square-wave voltage signal. The cyclical, offset excitation of the piezoelectric members 116(1) and 116(3) and the piezoelectric members 116(2) and 116(4) causes a corresponding cyclic and orthogonal bending motion of the element 110 back and forth in the first and second planes. This bending motion of the element 110 causes the threaded shaft 114 to rotate and translate in the direction along the length of the threaded passage 112 at a velocity based on the applied drive signals.

The first and second applied drive signals 470a,b are transmitted through electrical traces that are attached via solder to "L" shaped electrodes 134a and 136a on the first member 116(1) and also to respective "L" shaped electrodes 134c and 136c, on the third member 116(3). The third and fourth applied drive signals 470c,d are transmitted through electrical traces that are attached via solder to "L" shaped electrodes 134b and 136b on the second member 116(2) and also to respective "L" shaped electrodes 134d and 136d on the fourth member 116(4). By way of example only, the "L" shaped electrodes 134a-d and 136a-d shown in FIGS. 1A and 1B can be located on longer edges of the members 116(1)-116(4).

The actuator controller system 106 in the driving system 104 in this embodiment is the same in structure and operation as, for example, the actuator controller system illustrated and disclosed in U.S. patent application Ser. No. 12/228,923, filed Aug. 18, 2008 for, "Reduced-Voltage, Linear Motor Systems and Methods Thereof" which is herein incorporated by reference, except as illustrated and described herein, although other types of actuator controller systems can be used. The actuator controller system 106 includes an actuator processing device 124 with a signal generator system 126, a supply voltage or voltage source 128, although the actuator controller system 106 can include other types and numbers of systems, devices, and components which are connected in other manners.

The actuator processing device 124 in the actuator controller system 106 includes a processor 123, a memory storage device 125, user input device 127, a display 129, a communication interface system 131, and the signal generator system 126 which are coupled together by a bus or other link 135, although other numbers and types of systems, devices, and components in other configurations can be used and the signal generator system 126 can be separate from the actuator processing device 124. The processor 123 executes a program of stored instructions for one or more aspects of the present invention as described herein, including for reducing power consumption of the actuator device 102(1).

According to some embodiments, actuator processing device 124 includes a phase shifting circuit to generate at least two low-voltage driving signals 154(1) and 154(2) that can be a square wave, for example. The actuator processing device 124 is configured to phase shift one of the low-voltage driving signals 154(1) and 154(2) ninety degrees with respect to the other and to transmit the signals after further processing (e.g., by inverters 158(1) and 158(2)) to the first and second full bridge drive systems 156(1) and 156(2). Specifically, the first low-voltage driving signal 154(1) is transmitted to the first full bridge drive system 156(1) and the second input signal 156(2) is transmitted to the second full bridge drive system 156(2). According to some embodiments, the phase shifting circuit can be referred to as a limitation circuit.

The memory storage device 125 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium having instructions stored thereon for performing various steps of the invention, which is read from and/or written to by a magnetic, optical, or other reading and/or writing system that is coupled to the processor 123 can be used for the memory storage device 125.

The memory storage device 125 can include an n-bit register (also referred to herein as an accumulator) to store a value of the time period of full bridge drive signals 470a-d, although other types of storage devices at other locations could be used for storing other types of data about full bridge drive signals 470a-d.

The memory storage device 125 also stores a value of a delay time which can be applied at an end or a beginning of one or more pulses of a full bridge cycle driving signal, or at transition points of the full bridge cycles across a baseline, although the delays can be applied at other times in the cycle. As explained in greater detail herein, application of a delay leads to reduction in overall power consumption by the resonant actuator system 100(1). By way of example only, the stored delay time is 320 ns, although other lengths of delays can be stored and applied. Additionally, the delay or dead time stored in the memory storage device 125 can be varied for different full bridge cycles depending upon the particular output requirements of the actuator device 102(1).

The user input device 127 is used to input selections, such as a selected velocity for operation of the actuator device 102(1) or one or more delay times to be applied, although the user input device could be used to input other types of data and actions and interact with other elements. The user input device 127 can include a computer keyboard and a computer mouse, although other types and numbers of user input devices can be used.

The display 129 is used to show the graphical user interface for inputting requests, such as a selected motor speed (forward and/or reverse) for the actuator device 102(1) and the delay time to be introduced, and viewing the resulting response, although other types and amounts of information can be displayed in other manners. The display 129 can include a computer or mobile communications device display screen, such as a CRT or LCD screen, although other types and numbers of displays such as a light emitting diode (LED) could be used.

The communication interface system 131 is used to operatively couple and communicate between the actuator processing device 124 and the driver assembly 108 along with the actuator device 102(1) via one or more communications networks, although other types and numbers of connections, configurations, and communication manners can be used.

The signal generator system 126 generates at least two low-voltage driving signals 154(1) and 154(2) which are provided to full bridge drive systems 156(1) and 156(2) in driver assembly 108 in response to instructions from the actuator processing device 124, although the signal generator system could generate other numbers and types of signals which are provided to other types and numbers of systems or devices. Inverters 158(1) and 158(2) are coupled between the signal generator system 126 and the driver assembly 108 and each receive the low-voltage driving signals 154(1) and 154(2), respectively, which are inverted to generate additional input drive signals 152(2) and 152(4), respectively. The low voltage and inverted input drive signals 152(1), 152(2), 152(3), and 152(4) are input through the driver assembly 108 to drive the four piezoelectric members 116(1), 116(2), 116(3), and 116(4), although other numbers and types of signals could be generated and used.

The voltage source 128 in the actuator controller system 106 is a battery supply system that supplies power to run the actuator processing device 124 and the driver assembly 108 (for ease of illustration the coupling to each $V_{DD}$ of the driver assembly 108 is not shown), although other types and numbers of power supplies which supply power to types and numbers of system, devices, and components can be used. By way of example only, voltage source 128 can be a battery in, for example, a cell phone, a camera, or a PDA.

Although an embodiment of the actuator controller system 106 with the actuator processing device 124 is described and illustrated herein, each of these systems could be implemented on any suitable computer system or device or an application specific integrated circuit or other programmable entity. For example, actuator processing device 124 can form or include an adjustment system within that adjusts applied drive signals 470a-d by introducing a delay for a first period of time during or at one of at and about a transition in the driving signal, and an output management system that controls driving system including driver assembly 108 for coupling one or more applied drive signals 470a-d with the delay to at least one partially resonant actuator device (e.g., actuator device 102(1)). It is to be understood that the systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, application specific integrated circuits, digital signal processors, and microcontrollers, programmed according to the teachings of the embodiments, as described and illustrated herein, and as will be appreciated by those ordinary skill in the art.

In addition, two or more computing systems or devices can be substituted for any one of the systems in any embodiment. Accordingly, principles and advantages of distributed processing, such as redundancy and replication also can be implemented, as desired, to increase the robustness and performance of the devices and systems of the embodiments. The embodiments may also be implemented on computer system, systems, or other devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

The driver assembly 108 in this embodiment is the same in structure and operation as the driver assembly illustrated and disclosed in U.S. patent application Ser. No. 12/228,923, filed Aug. 18, 2008 for, "Reduced-Voltage, Linear Motor Systems and Methods Thereof" which is herein incorporated by reference, although other types of driver assemblies can be used. The driver assembly 108 is a full bridge driver which includes full bridge drive systems 156(1) and 156(2) coupled to the voltage source 128, although the driver assembly 108 can include other numbers and types of systems, devices, assemblies, and components in other configurations.

By way of example only, the full bridge drive systems 156(1) and 156(2) amplify and split the input low-voltage driving signals 154(1) and 154(2), respectively into applied drive signals 470a-b and 470c-d, respectively. For example, one of the applied drive signals 470a,b is phase shifted 180 degrees relative to the other electrical signal to double the effective voltage differential across piezoelectric layers of the piezoelectric members 116(1) and 116(3). The first and second applied drive signals 470a,b are transmitted to piezoelectric members 116(1) and 116(3) via a flex circuit (not shown) to drive the members piezoelectric members 116(1) and 116(3). Similarly, one of the applied drive signals 470c,d is phase shifted 180 degrees relative to the other electrical signal to double the effective voltage differential across piezoelectric layers of the piezoelectric members 116(2) and 116(4). The third and fourth applied drive signals 470c,d are transmitted to piezoelectric members 116(2) and 116(4) via the flex circuit to drive the piezoelectric members 116(2) and 116(4).

According to some embodiments, using a full bridge drive system 156(1) and 156(2) to transmit the applied drive signals 470a-d to their respective piezoelectric members 116(1)-116(4) allows for the driving system 104 to be commonly grounded at ground point 462. The electrodes 134a-d and 136a-d are floating relative to common ground and are driven independently, which eliminates a need for soldering a common ground wire to the element 110, as is typically required in linear motor systems. Eliminating the common ground wire soldered to the element 110 reduces the time and cost it takes to make a linear motor, e.g., the actuator device 102(1).

The driver assembly has four outputs to provide the approximately square wave applied drive signals 470(a)-470(d) to the actuator device 102(1), although other types and numbers of outputs which provide other types and numbers of signals, such as sinusoidal shaped-signals by way of example only, can be used. One of the advantages of using a full bridge drive circuit is that the effective voltage differential across the positive electrode and negative electrode of each of the piezoelectric members 116(1), 116(2), 116(3), and 116(4) is twice the supply voltage, which effectively doubles the mechanical output as compared with a half bridge circuit with the same supply voltage, which may save space.

With reference to FIGS. 1A and 1B, according to some embodiments, the first piezoelectric member 116(1) and the third piezoelectric member 116(3) comprise a first pair of opposing members that operate together; and the second piezoelectric member 116(2) and the fourth piezoelectric member 116(4) comprise a second pair of opposing members that operate together. The applied drive signals 470a,b provided to the first pair of opposing members are phase shifted about 90 degrees relative to the applied drive signals 470c,d provided to the second pair of opposing members to cause the threaded shaft 114 to rotate and translate in the direction along a first axis of rotation. A positive 90 degree phase shift, will produce a positive or forward translation of the threaded shaft 114, where a negative 90 degree phase shift will produce a negative or backward translation of the threaded shaft 114. According to some embodiments, a frequency of applied drive signals 470a-d is substantially the same as the first bending mode resonance of the resonant actuator system 100(1). While certain electrical signals and phase shifts have been described, it is contemplated that other frequency ranges, shapes, and phase differences of the applied drive signals 470a-d can be implemented.

Additionally, although not shown, the actuator device 102(1) can have a position sensor or other type of sensor which provides feedback on the measured speed of the actuator device 102(1) to be used in a closed feedback loop adjust the speed of the actuator device 102(1).

Figure 2:
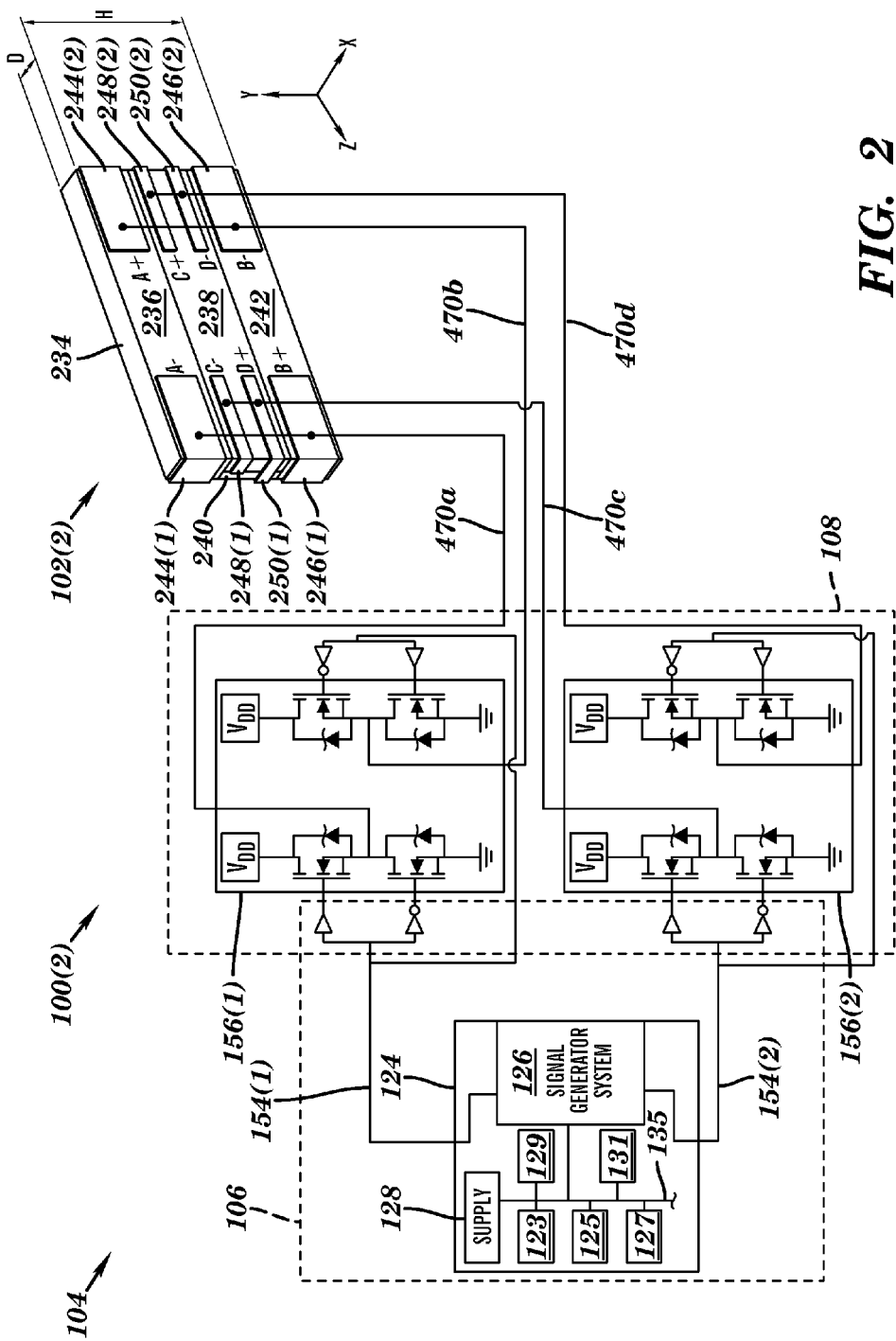
FIG. 2 is a partial block diagram, partial circuit diagram, and a partial end view of an at least partially resonant drive actuator system in accordance with embodiments of the present invention.

Referring to FIG. 2, an at least partially resonant drive actuator system 100(2) (also referred to herein as resonant actuator system 100(2)) in accordance with other embodiments of the present invention is illustrated. The resonant actuator system 100(2) is the same as resonant actuator system 100(1) in structure and operation, except as illustrated and described herein. Elements in resonant actuator system 100(2) which are like those in resonant actuator system 100(1) have like reference numerals. Except as described herein below, the resonant actuator system 100(2) according to this embodiment is the same in structure and operation as the linear actuator device illustrated and disclosed in U.S. patent application Ser. No. 12/228,943, filed Aug. 18, 2008 for, "Semi-Resonant Driving Systems and Methods Thereof," which is herein incorporated by reference, although other types of actuator devices can be used.

The resonant actuator system 100(2) includes an actuator device 102(2) and a driving system 104 including an actuator controller system 106 and a driver assembly 108, although the system can comprise other numbers and types of systems, devices, and components which are connected in other manners. Since the driving system 104 with the actuator controller system 106 and the driver assembly 108 are the same as illustrated and described earlier with reference to FIGS. 1A and 1B, they will not be described in detail herein again.

The actuator device 102(2) generates a two-dimensional trajectory to frictionally couple to and drive a moveable load, such as an optical lens by way of example only, in either of at least two opposing directions, although the actuator device 102(2) can generate other types of trajectories, be coupled in other manners and at other locations, and move other types of loads in other directions. The semi-resonant or partially resonant actuator device 102(2) that generates the two-dimensional trajectory to frictionally couple to and drive a moveable load in this embodiment is the same in structure and operation as semi-resonant or partially resonant actuator device illustrated and disclosed in the above referenced U.S. patent application Ser. No. 12/228,943, which is herein incorporated by reference, although other types of actuator devices can be used.

The details of actuator device 102(2) including an asymmetrical, elongated structure 234 are disclosed in the above-incorporated U.S. patent application Ser. No. 12/228,943 will not be repeated here. For example, the elongated structure 234 includes four piezoelectric regions 236, 238, 240, and 242, and electrodes 244(1) and 244(2), electrodes 246(1) and 246(2), electrodes 248(1) and 248(2), and electrodes 250(1) and 250(2), although the actuator device 102(2) can comprise other numbers, types and shapes of structures with other numbers and types of regions and connectors. By way of example only, in alternative embodiments one of the two piezoelectric regions 236 and 242 and one of the piezoelectric regions 238 and 240, could be inactive which would reduce the drive amplitude, but otherwise would not alter the operation of the actuator system, although other combinations of active and inactive regions could be used.

Although, exemplary full bridge drivers have been described in FIGS. 1A-B and 2, it should be noted that the invention does not depend on the type of full bridge used. For example only, full bridge driver could be implemented on CMOS or bipolar and as switches or as current sources, depending upon the particular application.

Referring to FIGS. 1A, 1B, 2, and FIG. 4, operation of resonant actuator system 100(1) for implementing an exemplary method for reducing power consumption of resonant actuator systems 100(1) and 100(2) will now be described using a flowchart 300 in FIG. 3 in accordance with embodiments of the present invention. For ease of discussion, only the voltage applied at a single piezoelectric member 116(1) is shown for resonant actuator system 100(1) is being described using flowchart 300 and FIG. 4, although the discussion below is equally applicable to other piezoelectric members 116(2)-116(4) and to resonant actuator system 100(2). The voltages applied to piezoelectric members 116(2)-116(4) are substantially identical to the voltage applied to 116(1) except for a phase shift as described above with respect to the first and second full bridge drive systems 156(1) and 156(2). In step 302, a transition from a first switching state A towards a second switching state C is determined by the actuator control system 106. The switching states A and C are a part of a switching sequence 402 that includes switching states A, B, C, and D implemented using at least one of the first and second full bridge drive systems 156(1) and 156(2), for example. Switching states A, B, C, and D are used to output a single full bridge cycle shown by full bridge cycle plot 406 using the driving system 104. By way of example only, switching sequence 402 is implemented using ON-OFF switches and piezoelectric member 116(1) across which voltage $V_{DD}$ is measured. Further, switches used for implementing switching states A, B, C, and D can be, for example, CMOS, FET, or other types of switches well known to those skilled in the art. The switching sequence is realized by opening and closing of switches in different combinations resulting in voltage changing from low to high and back to low via transitions occurring due to capacitance of piezoelectric member 116(1), as shown. Correspondingly, full bridge cycle plot 406 illustrates the voltage swing between $+V_{DD}$ to $-V_{DD}$ at the electrodes of piezoelectric member 116(1) as a function of time, although other voltage values can also be used depending on specific applications. Further in step 302, actuator control system 106 determines a period of one driving cycle for the resonant actuator system 100(1).

According to embodiments of the invention, an intermediate switching state B is inserted between switching states A and C. As shown in plot 406, voltage level 406a corresponds to switch configuration A when output voltage at the electrodes of piezoelectric member 116(1) is at $-V_{DD}$. Upon a change to the intermediate switch configuration B, output voltage at the electrodes of piezoelectric member 116(1) shown in plot 406 starts an upward transition shown by voltage level 406b. The rate of voltage change is determined by the switch resistance or other active or passive current constraints in the circuit(s) of resonant actuator system 100(1), which are well known to those skilled in the art.

In step 304, actuator control system 106 determines a dead time/delay time interval 408 during the transition from the first switching state A to the second switching state C and similarly a dead time/delay time interval 412 during the transition from the second switching state C to the first switching state A. At this point, actuator processing device 124 commands the voltage output of piezoelectric member 116(1) to hold the intermediate switching state B for an amount of time equal to dead time/delay time interval 408 or 412, depending on which transition is taking place. Although in the example shown in FIG. 4, the intermediate switching state B is held when electrodes of voltage at the electrodes of piezoelectric member 116(1) is in between $+V_{DD}$ and $-V_{DD}$, application of dead time/delay interval 408 by holding the intermediate switching state B can be performed at any point in the voltage transition shown by voltage levels 406b and 406c.

When dead time/delay time interval 408 has been applied for a pre-determined amount of time, actuator processing device 124 executes instructions for switching sequence 402 to change from intermediate switching state B to the second switching state C, where output voltage at the electrodes of piezoelectric member 116(1) continues to rise towards $+V_{DD}$, as shown by voltage level 406c. Once output voltage at the electrodes of piezoelectric member 116(1) reaches $+V_{DD}$, a steady state voltage $+V_{DD}$, shown as voltage level 410, is maintained for a duration of time determined, for example, in step 302 as the time period of the full bridge cycle plot 406. Towards the end of voltage level 410, a transition from voltage level 410 (equal to $+V_{DD}$) towards voltage level 406a (equal to $-V_{DD}$) is initiated. Accordingly switching sequence 402 is changed from the second switching state C back towards the first switching state A. Upon a change to another intermediate switching state D, output voltage at the electrodes of piezoelectric member 116(1) showed in plot 406 starts a downward transition shown by voltage level 406d.

Actuator processing device 124 executes instructions that hold the another intermediate switching state D for a time period equal to dead time/delay time interval 412. After dead time/delay time interval 412, output voltage at the electrodes of piezoelectric member 116(1) shown in plot 406 continue the downward transition towards voltage level 406e and the first switching state A is applied again. According to one embodiment of the invention, dead time/delay time interval 408 or 412 can be about 6% of the time period of full bridge cycle shown in plot 406. According to yet another embodiment of the invention dead time/delay time interval 408 or 412 can be from 2% to 10% of the time period of full bridge cycle shown in plot 406.

In step 306, by transitioning from first switching state A to an intermediate switching B to a second switching state C to another switching state D and back to the first switching state A, actuator controller system 106 generates a switching state timing sequence for a complete full bridge cycle of driving system 104.

In step 308, the generated driving sequence is provided to the driving system 104 to generate the applied drive signals 470a-d and sent to the actuator device 102(1).

In step 310, the generated driving sequence is repeated for successive cycles to energize the actuator devices 102(1) and 102(2) and generate movement along one or more directions based upon piezoelectric action of piezoelectric members 116(1)-116(4).

In step 312, applied drive signals 470a-d are stopped to stop actuator motion.

Referring again to FIG. 4, although holding switching states B and C is disclosed herein as a technique to apply dead time/delay time intervals 408 and 412 during transitions between two voltage levels of full bridge driving system 104, dead time/delay time interval 408 or 412 can be applied using a delay circuit controlled by actuator processing device 124, or a software controlled delay element, or other signal delay methods well known to one skilled in the art. Such a delay circuit can be integrated with actuator controller system 106, or can be a discrete standalone circuit, implemented as a separate module of resonant actuator system 100(1). It is to be noted that although dead time/delay time intervals 408 and 412 are shown as being inserted when the voltage output of piezoelectric members 116(1)-116(4) is close to 0 Volts, dead time/delay time intervals 408 and 412 can also be applied during other time instances of full bridge cycle plot 406, depending on the particular application. By way of example only, dead time/delay time interval 408 can be equal to dead time/delay time interval 412. Alternatively, dead time/delay time interval 408 may not be equal to dead time/delay time interval 412, and both dead time/delay time intervals 408 and 412 may be programmable.

Figure 3:
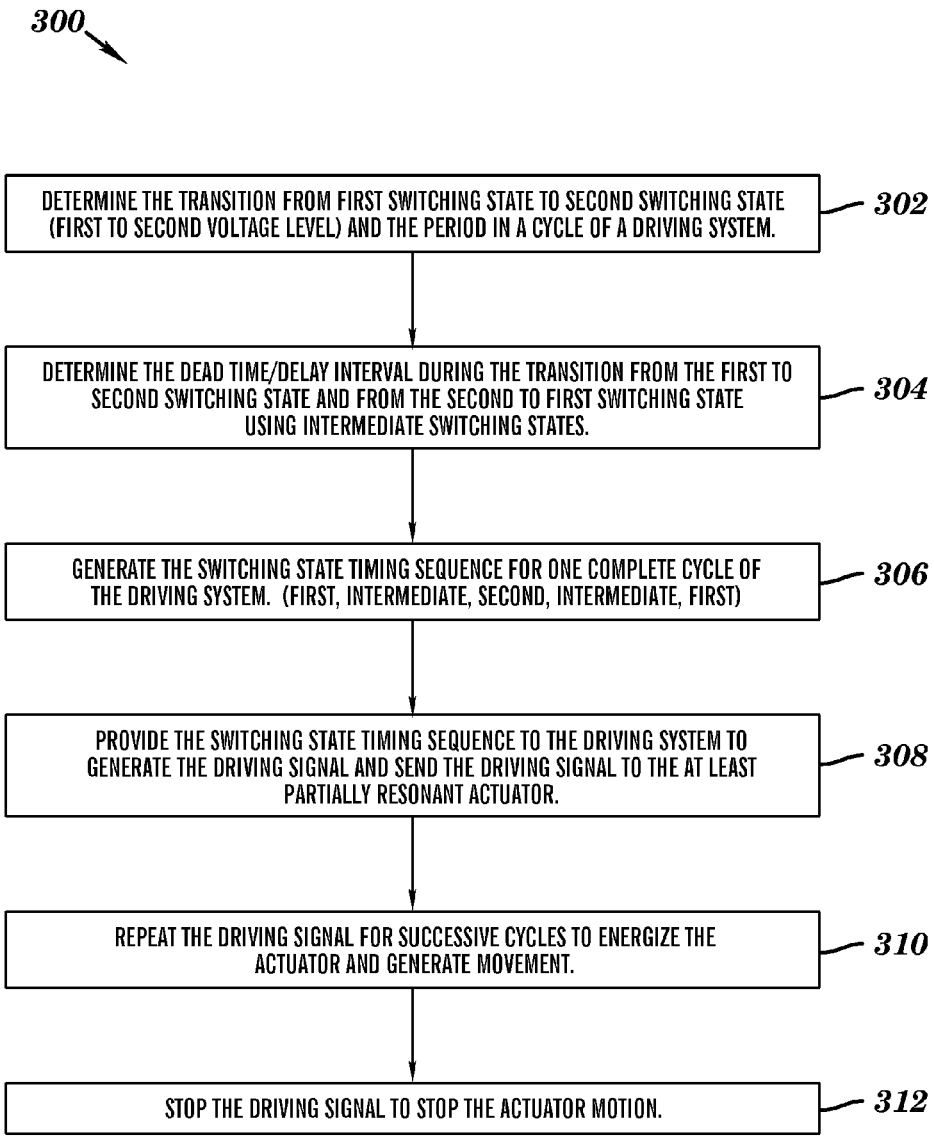
FIG. 3 is a flow chart of a method for reducing power consumption of an at least partially resonant actuator system in accordance with embodiments of the present invention.
Figure 4:
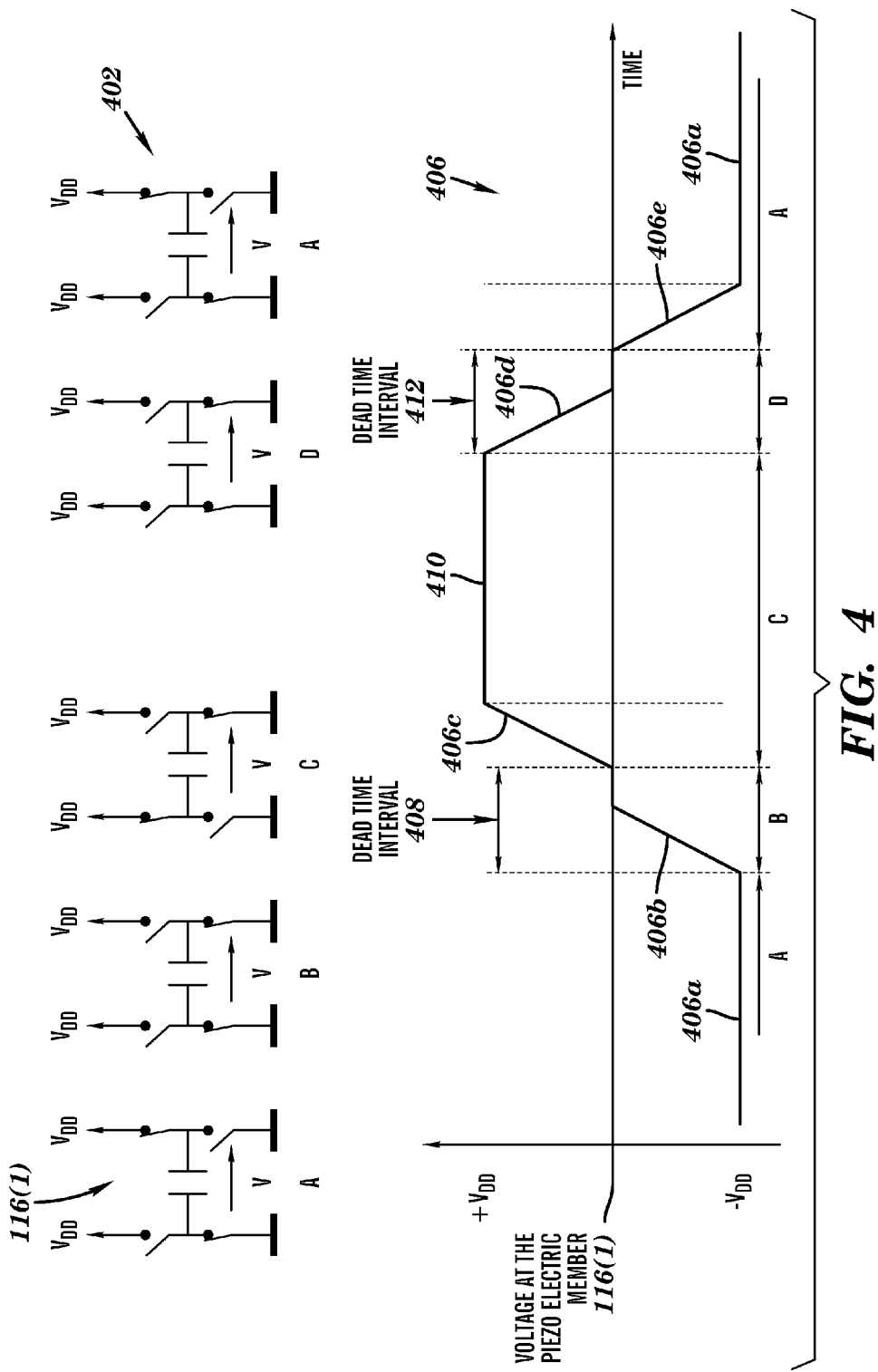
FIG. 4 is a high/low side switching sequence and a corresponding plot of voltage swing with a delay inserted using the switching sequence for the full bridge device of FIGS. 1A, 1B and 2, in accordance with embodiments of the present invention.

The operation of the resonant actuator system 100(2) of FIG. 2 is the same as illustrated and described herein for actuator system 100(1) with reference to FIGS. 3 and 4, except as illustrated and described herein. With the operation of the resonant actuator system 100(2), the applied drive signals 470a-d are generated to drive actuator device 102(2) and piezoelectric regions 236, 238, 240 and 242, as illustrated and described in U.S. patent application Ser. No. 12/228,943, filed Aug. 18, 2008 for, "Semi-Resonant Driving Systems and Methods Thereof," which is herein incorporated by reference in its entirety, although other methods of driving can also be used. The actuator device 102(2) receives the input drive signals 152(1), 152(2), 152(3), and 152(4) and operates as illustrated and described in the immediately above referenced U.S. patent application Ser. No. 12/228,943. Determination of dead time/delay time interval 408 or 412 proceeds in the same manner as monitoring of actuator device 102(1) in step 302. Steps 304-312 are also carried out in the same manner as described above with respect to actuator system 100(1), and with reference to FIGS. 1A-B, 2, and 3-6.

EXAMPLES

Figure 5:
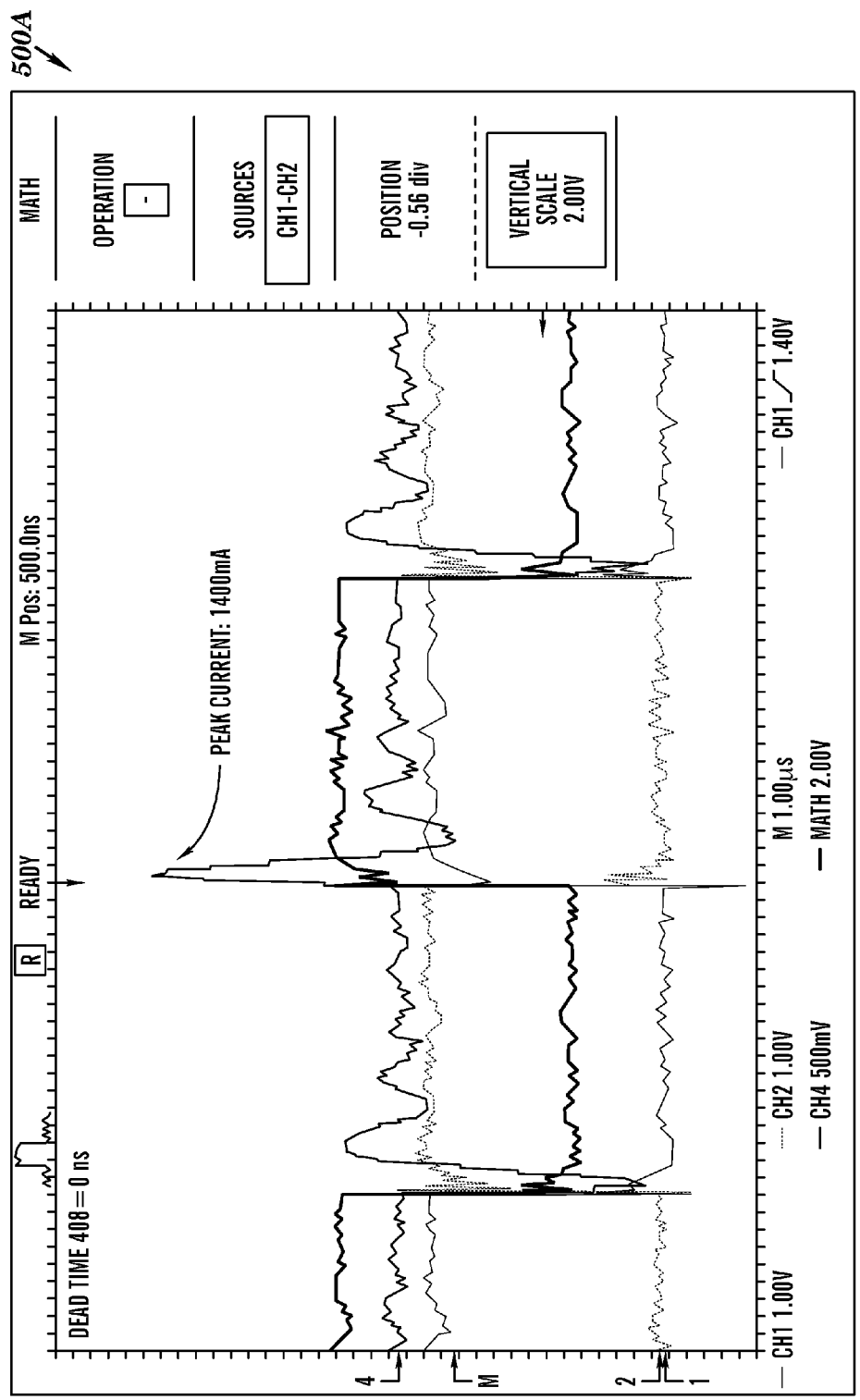
FIG. 5 are screen shots of a comparison between traces of high/low side of single phase full bridge drive signal with 0 dead time and with an exemplary 320 ns dead time applied at an end of a full bridge switching cycle in accordance with embodiments of the present invention.
Figure 5:
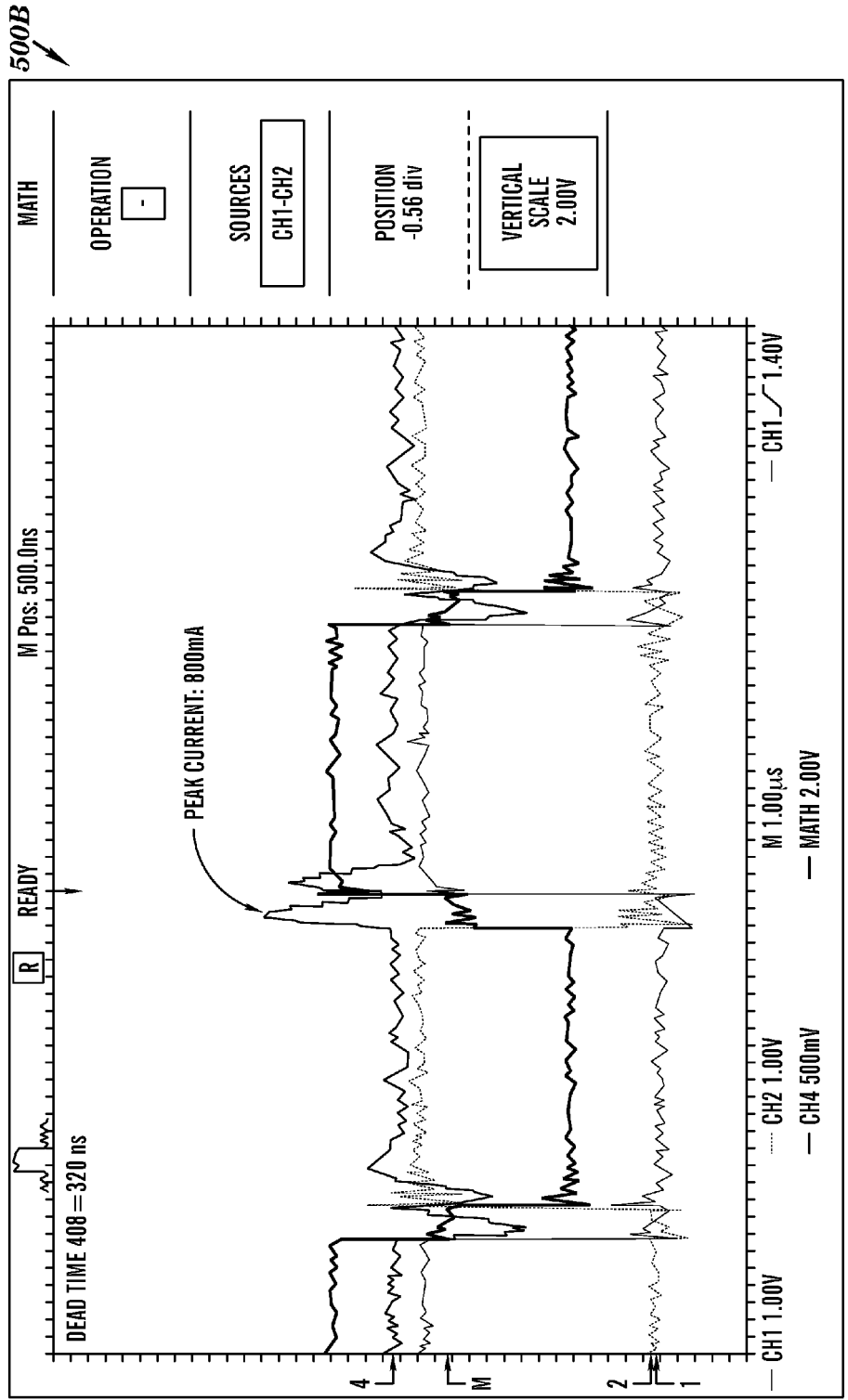

Referring to FIG. 5, exemplary plots 500a and 500b showing a comparison of peak current in resonant actuator system 100(1) without and with dead time/delay time interval 408, 412, respectively, applied to the full bridge cycle are illustrated. Plot 500a corresponds to a peak current of 1400 mA when no delay/dead time was applied during a full-bridge cycle (e.g., plot 406), as in a conventional resonant actuator system. In sharp contrast, plot 500b illustrates a peak current of 800 mA for the same set of parameters as plot 500a except for a delay of 320 ns (equal to dead time/delay time interval 408, 412) applied during a transition of voltage in a full bridge cycle plot 406, as shown in FIG. 4 above. Therefore, using various embodiments of the present invention, a lower peak current is seen which leads to a reduction in wear and tear of electronic and mechanical components without compromising on the steady output speed and power delivered to actuator device 102(1). Such peak currents can be analysed using actuator processing device 124, monitored, for example, on display 129, and/or optionally be stored in memory storage device 125.

Figure 6:
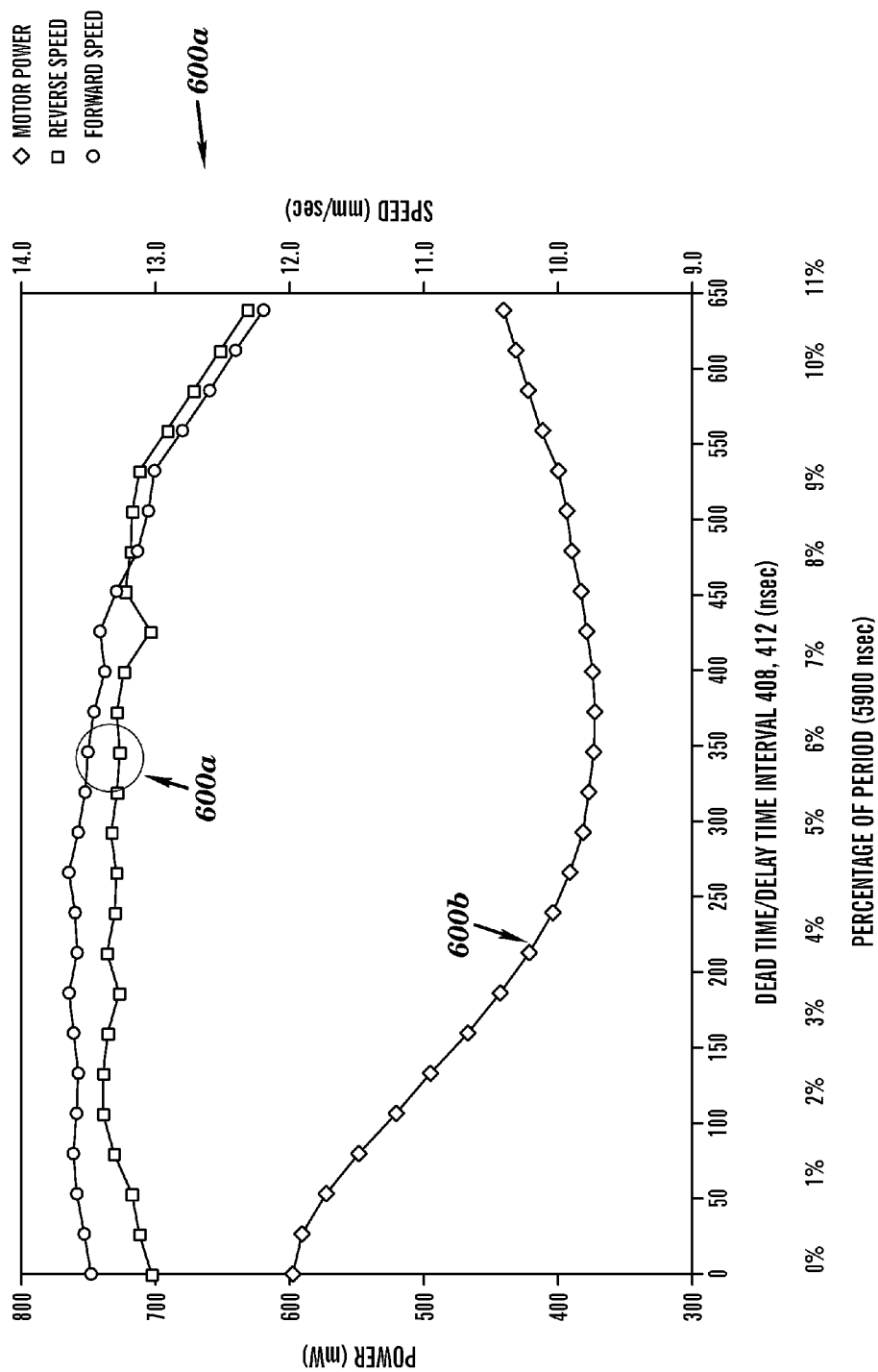
FIG. 6 is a graph of power consumption and corresponding speed versus a dead time value stored in an accumulator register applied during a transition or at the end or beginning of a full bridge switching sequence in accordance with embodiments of the present invention.

In yet another example shown in FIG. 6, plot 600 illustrates the advantageous effect of inserting a dead time/delay time interval 408, 412 between the transition of the low then the high side at the start of a pulse followed by the high then the low side at the end of the pulse (e.g., the full-bridge cycle plot 406 shown in FIG. 4), according to embodiments of the present invention. For dead time/delay time interval 408 (equal to dead time/delay time interval 412) ranging from 0 ns to about 650 ns, as shown by plot 600b power consumed by resonant actuator system 100(1) dropped to by about 35% from a maximum of 600 mW (for 0 ns dead time/delay time interval 408, 412) to a minimum of about 370 mW corresponding to a dead time/delay time interval 408, 412 of about 320 ns. Further, the drop in power consumption occurred at an almost constant output speed of 13-13.5 mm/s, as shown by plots 600a (forward and reverse speeds). According to one embodiment of the invention, maximum power savings occurred at a value of dead time/delay time interval 408, 412 equal to 6% of the period of the oscillating full bridge output, although significant power savings are attained when dead time/delay time interval 408, 412 is set to about 2% to 10% of the one cycle period of the full bridge output (e.g., equal to 5900 ns). Therefore, holding a switching state during a transition in the voltage output of piezoelectric members 116(1)-116(4) adding a calculated delay (e.g., dead time/delay time interval 408, 412) depending upon specific electrical and mechanical factors, actual velocity, and power consumed by resonant actuator systems, such as actuator device 102(1) or 102(2), can be desirably reduced without compromising on a steady output velocity and output force.

It is to be noted that although a full bridge cycle has been described, dead time/delay time intervals 408 and 412 can optionally be applied to other types and numbers of actuator systems. It is also to be noted that although the examples illustrated in FIGS. 5 and 6 are described with respect to actuator system 100(1), the same advantages of the present invention apply to other actuator systems, such as the resonant actuator system 100(2).

Accordingly, as described herein the present invention provides a number of advantages including providing more effective and efficient reduction in power consumption by resonant actuator systems and partially resonant actuator systems. With the present invention, by inserting a delay during a transition or at a beginning and/or end of a full bridge cycle (corresponding to a high side to low side transition or a low side to high side transition of a pulse), power consumption by the actuator device 102(1) is reduced without reducing the output force and speed. Additionally, the present invention is able to provide improved reduction in peak current leading to better spike tolerance and low overall noise in the actuator system.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for reducing power consumption of an at least partially resonant actuator system, the method comprising:
    adjusting a driving system with an actuator controller computing device configured to provide a driving signal including a delay interval during a transition in the driving signal; and
    providing with the driving system the driving signal with the delay interval to at least one partially resonant actuator device wherein the adjusting the driving signal comprises varying the delay interval while maintaining a substantially constant output velocity of the at least one partially resonant actuator device.

2. The method as set forth in claim 1 wherein the delay interval is about 2% to 10% of a time period of the driving signal.

3. The method as set forth in claim 2 wherein the delay interval is about 6% of the time period of the driving signal.

4. The method as set forth in claim 1 wherein the delay interval is inserted substantially at a halfway point during the transition.

5. The method as set forth in claim 1 wherein a duration of time for which the delay interval is applied is programmable.

6. The method as set forth in claim 1 wherein the driving system is a full bridge driver.

7. The method as set forth in claim 6 wherein the adjusting comprises:
inserting, during the transition, an intermediate switching state corresponding to the delay interval between a first and a second switching state of the full bridge driver;
holding the intermediate switching state for a period of time; and
switching to the first or the second switching state after the period of time is over.

8. The method as set forth in claim 1 wherein the determining with the actuator controller computing device when the transition in the driving signal occurs, wherein the adjusting is based on the determined transition.

9. The method as set forth in claim 1 wherein the adjusting further comprises adjusting the driving signal to include the delay interval for a first period of time during the transition from a low side of the driving signal with respect to a baseline to a high side of the driving signal with respect to the baseline, and wherein the low side corresponds to a first switching state and the high side corresponds to a second switching state of the driving system.

10. The method as set forth in claim 1 wherein the adjusting further comprises adjusting the driving signal to include the delay interval for a second period of time during the transition from a high side of the driving signal with respect to a baseline to a low side of the driving signal with respect to the baseline, and wherein the low side corresponds to a first switching state and the high side corresponds to a second switching state of the driving system.

11. The method as set forth in claim 1 further comprising repeating the adjusting and the providing for successive cycles of the driving signal.

12. An at least partially resonant actuator system comprising:
an actuator controller computing device that adjusts a driving system based upon a driving signal including a delay interval during a transition in the driving signal; and
at least one partially resonant actuator device that receives the driving signal with the delay interval from the adjusted driving system wherein the adjusting the driving signal comprises varying the delay interval while maintaining a substantially constant output velocity of the at least one partially resonant actuator device.

13. The at least partially resonant actuator system as set forth in claim 12 wherein the delay interval is about 2% to 10% of a time period of the driving signal.

14. The at least partially resonant actuator system as set forth in claim 13 wherein the delay interval is about 6% of the time period of the driving signal.

15. The at least partially resonant actuator system as set forth in claim 12 wherein the delay interval is inserted substantially at a halfway point during the transition.

16. The at least partially resonant actuator system as set forth in claim 12 wherein a duration of time for which the delay interval is applied is programmable.

17. The at least partially resonant actuator system as set forth in claim 12 wherein the driving system is a full bridge driver.

18. The at least partially resonant actuator system as set forth in claim 12 wherein the actuator controller computing device that adjusts a driving system based upon a driving signal inserts, during the transition, an intermediate switching state corresponding to the delay interval between a first and a second switching state of the full bridge driver, holds the intermediate switching state for a period of time, and switches to the first or the second switching state after the period of time is over.

19. The at least partially resonant actuator system as set forth in claim 12 wherein the actuator controller computing device is configured to determine when the transition in the driving signal occurs, wherein the adjusting is based on the determined transition.

20. The at least partially resonant actuator system as set forth in claim 12 wherein the actuator controller computing device further adjusts the driving signal to include the delay interval for a first period of time during the transition from a low side of the driving signal with respect to a baseline to a high side of the driving signal with respect to the baseline, and wherein the low side corresponds to a first switching state and the high side corresponds to a second switching state of the driving system.

21. The at least partially resonant actuator system as set forth in claim 12 wherein the actuator controller computing device further adjusts the driving signal to include the delay interval for a second period of time during the transition from a high side of the driving signal with respect to a baseline to a low side of the driving signal with respect to the baseline, and wherein the low side corresponds to a first switching state and the high side corresponds to a second switching state of the driving system.

22. The at least partially resonant actuator system as set forth in claim 12 wherein the actuator controller computing device is further configured to repeat the adjusting of the driving signal and provides the adjusted driving signal to the at least one partially resonant actuator device for successive cycles of the driving signal.

* * * * *